US009277483B2

(12) United States Patent
Su

(10) Patent No.: US 9,277,483 B2
(45) Date of Patent: Mar. 1, 2016

(54) USER GEO-LOCATION PATTERN ANALYSIS

(71) Applicant: Verizon Patent and Licensing Inc., Basking Ridge, NJ (US)

(72) Inventor: Yu Su, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 243 days.

(21) Appl. No.: 14/039,385

(22) Filed: Sep. 27, 2013

(65) Prior Publication Data

US 2015/0094021 A1 Apr. 2, 2015

(51) Int. Cl.
*H04W 48/04* (2009.01)
*H04W 4/02* (2009.01)
*H04W 12/06* (2009.01)

(52) U.S. Cl.
CPC .............. *H04W 48/04* (2013.01); *H04W 4/028* (2013.01); *H04W 12/06* (2013.01)

(58) Field of Classification Search
CPC ...... H04W 12/06; H04W 48/04; H04W 4/028
USPC .............................................. 455/550.1, 411
See application file for complete search history.

(56) References Cited

U.S. PATENT DOCUMENTS

| 7,995,989 | B2 * | 8/2011 | Wiedeman et al. ............ 455/407 |
| 8,869,305 | B1 * | 10/2014 | Huang ............................. 726/29 |
| 8,911,507 | B1 * | 12/2014 | Gilbert et al. .................... 726/35 |
| 2002/0123343 | A1 * | 9/2002 | Wiedeman et al. ............ 455/429 |
| 2007/0258421 | A1 * | 11/2007 | Alizadeh-Shabdiz et al. ............ 370/338 |
| 2009/0309789 | A1 * | 12/2009 | Verechtchiagine ...... 342/357.07 |
| 2011/0177832 | A1 * | 7/2011 | Huang ........................... 455/457 |
| 2013/0225196 | A1 * | 8/2013 | James et al. ................ 455/456.1 |
| 2013/0244687 | A1 * | 9/2013 | Stargardt et al. ........... 455/456.1 |

* cited by examiner

*Primary Examiner* — William Nealon

(57) ABSTRACT

A device receives location information associated with a user of a user device. The location information includes location coordinates associated with the user device over time, and includes errors introduced by one or more location methods used to determine the location information. The device calculates a radius of a geo-location pattern based on the location information, where the geo-location pattern identifies a geographical area encompassing one or more of the location coordinates of the user device. The device calculates center coordinates of the geo-location pattern based on the location information, and determines the geo-location pattern based on the calculated radius and the calculated center coordinates. The device outputs or stores the geo-location pattern.

20 Claims, 15 Drawing Sheets

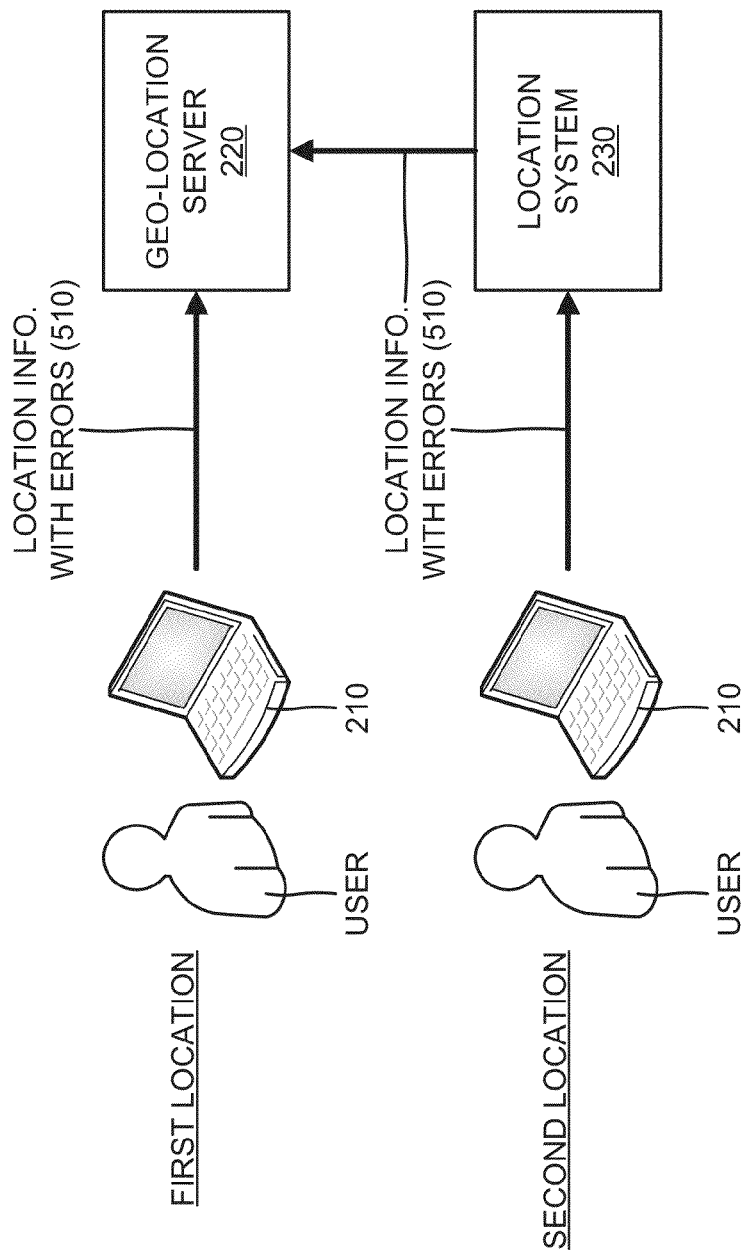

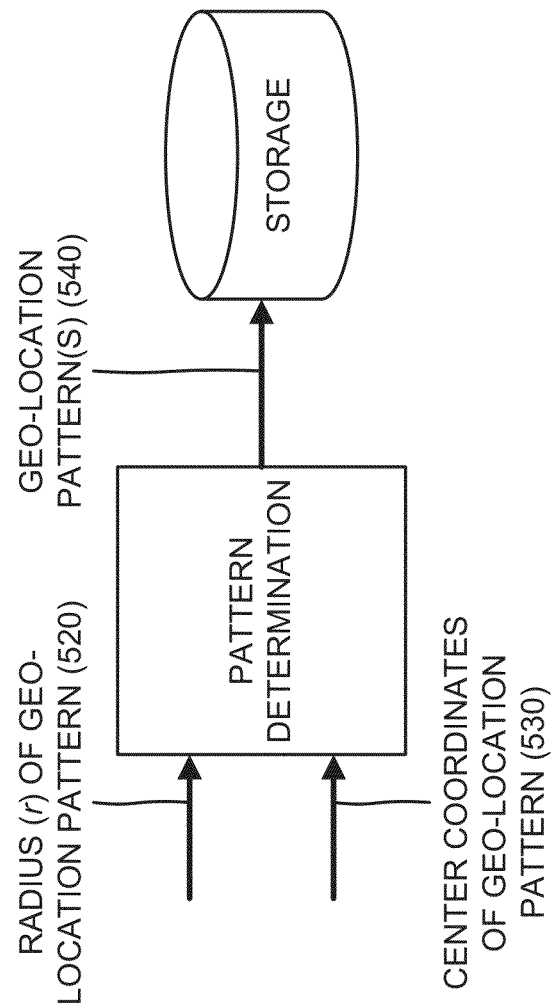

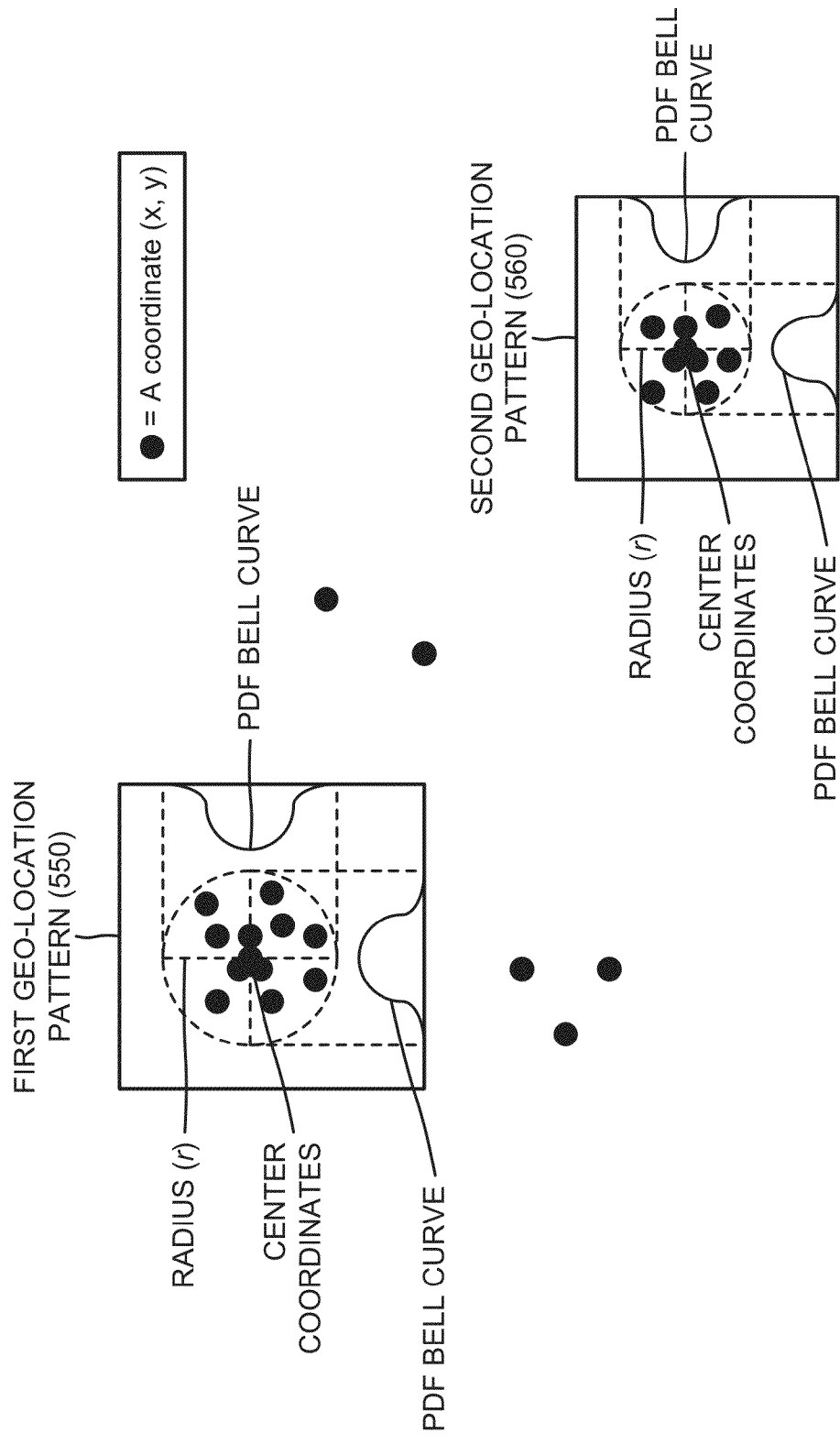

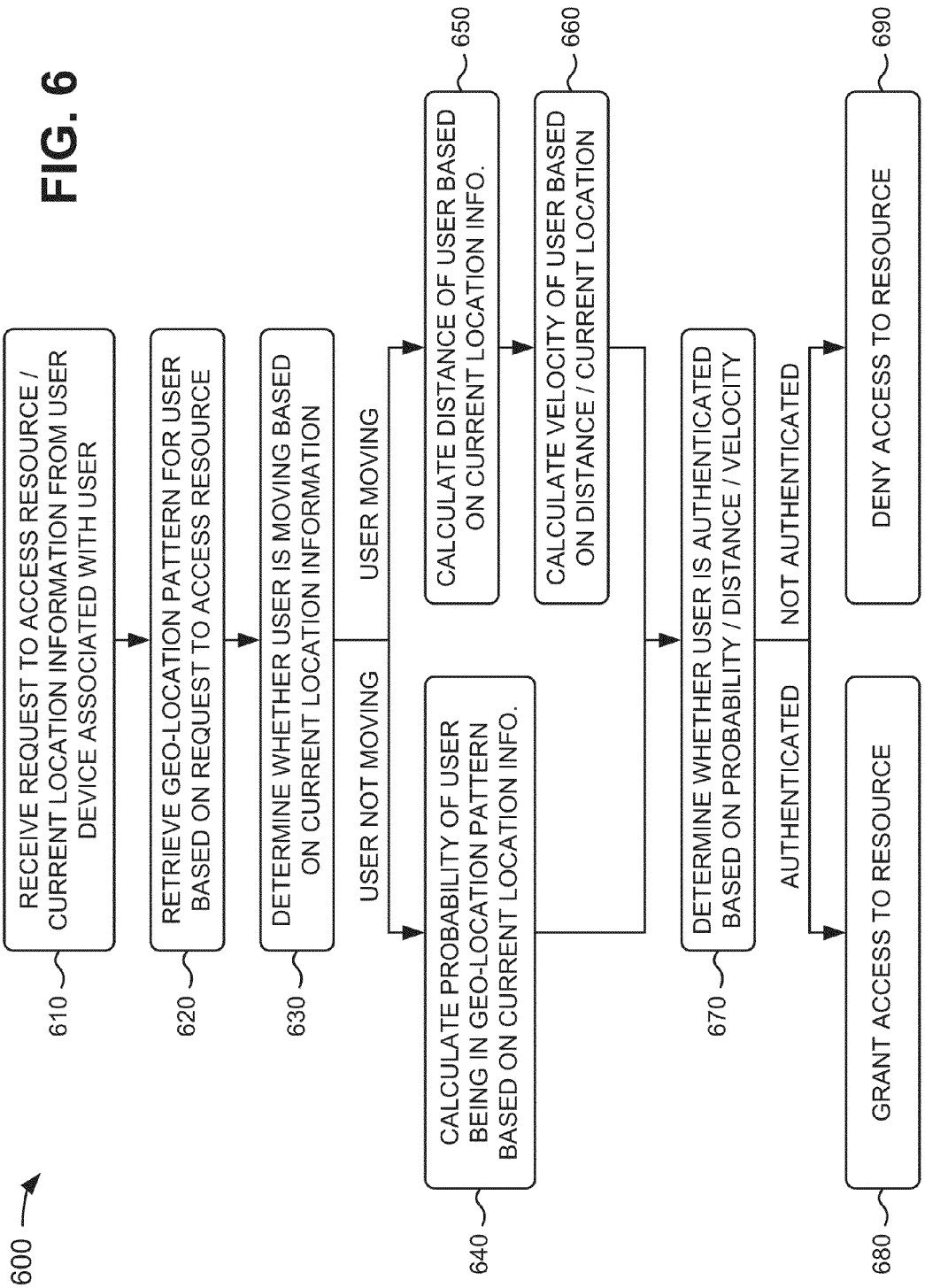

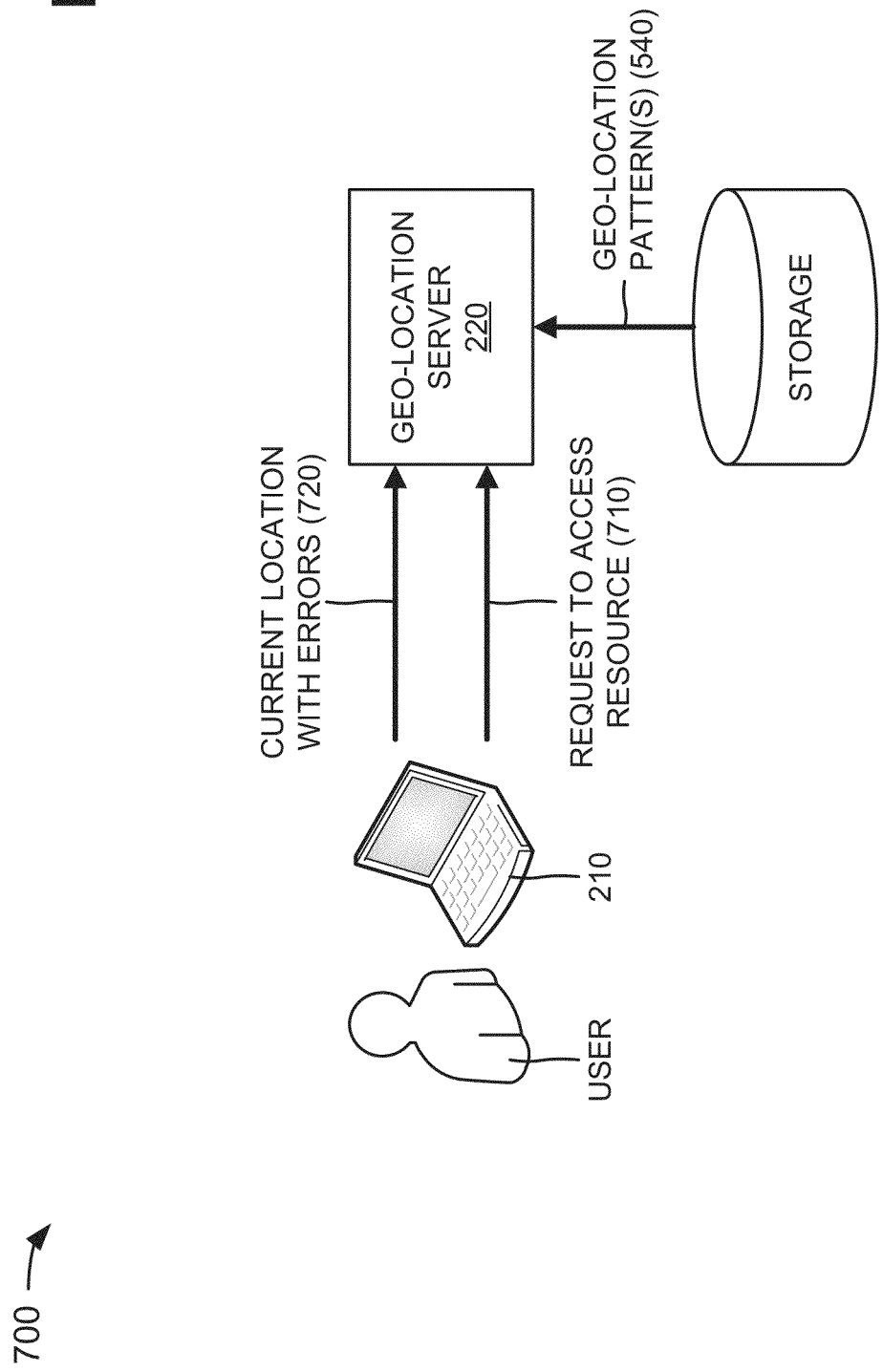

USER GEO-LOCATION PATTERN ANALYSIS

BACKGROUND

Geo-location may include an identification of a geographical location of an object, such as a radar device, a mobile device, or an Internet-connected computer, associated with a user. Many web services and applications may require that a user's geo-location be captured and analyzed. For example, if a user is utilizing an application on a mobile device to obtain directions to a particular location, the application may require the geo-location of the mobile device in order to provide accurate directions. As more and more users utilize mobile devices (e.g., smart phones), geo-location has become a more important factor in identifying such users. For example, identifying a user's geo-location has become a factor used to authenticate a user and prevent potential fraud.

Geo-location may be defined as a pair of real numbers (e.g., x, y) that may be interpreted as latitude (x) and longitude (y). Thus, a number pair (x,y) may represent a unique point on the surface of the Earth. If measured in degrees, the latitude (x) may range from negative ninety degrees (−90°) to ninety degrees (90°), and the longitude (y) may range from negative one-hundred and eighty degrees (−180°) to one-hundred and eighty degrees (180°).

Currently, multiple techniques may be used to obtain a user's current location, such as for example, looking up an Internet protocol (IP) address of a computing device, obtaining global positioning system (GPS) coordinates of a mobile device, performing cell tower triangulation of a mobile device, etc. At a given point in time, such techniques may provide a user's geo-location, but may also introduce errors into the user's geo-location. For example, assume that $(x_0,y_0)$ are the exact location coordinates of a user at a particular time (t), but that the techniques provide (x,y) as the location coordinates of the user. Further, assume that the exact location coordinates $(x_0,y_0)$ do not match the location coordinates (x,y). In such an example, an error (or an inaccuracy) may be defined as a distance between the exact location coordinates $(x_0,y_0)$ and the location coordinates (x,y). Furthermore, different techniques introduce different errors into the user's geo-location. For example, GPS coordinates of a mobile device may be accurate within 9.144 meters, and cell tower triangulation of a mobile device may be accurate within 0.804 kilometers. Geo-location errors may also be introduced by a user's location, meteorological conditions, devices utilized by the user, etc.

BRIEF DESCRIPTION OF THE DRAWINGS

FIGS. 5A-5E are diagrams of an example relating to the example process shown in FIG. 4;

FIG. 6 is a flow chart of an example process for utilizing a geo-location pattern to authenticate a user; and FIGS. 7A-7E are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Figure 1:
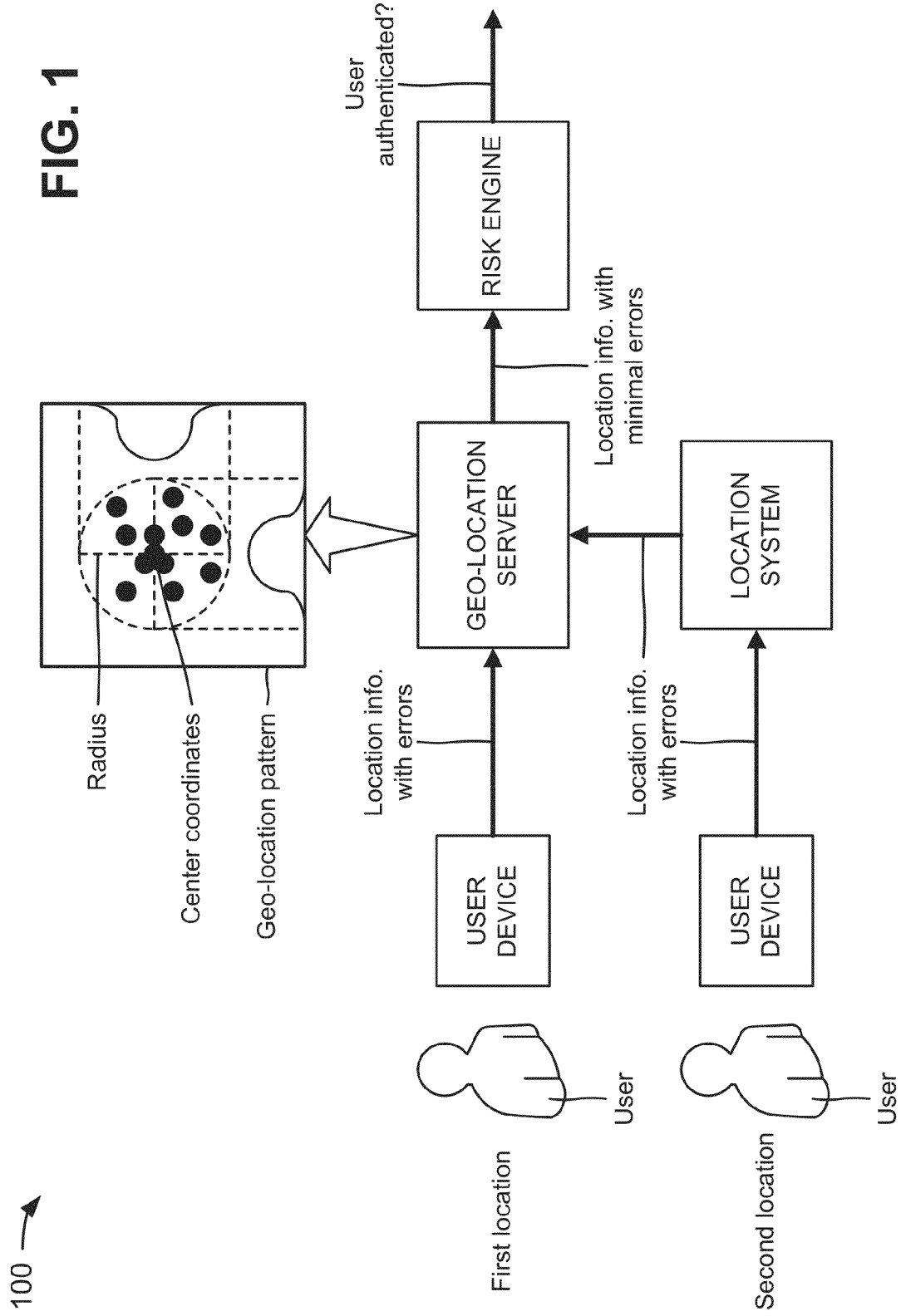
FIG. 1 is a diagram of an overview of an example implementation described herein.

FIG. 1 is a diagram of an overview of an example implementation 100 described herein. As shown, a user device, a geo-location server, a location system, and a risk engine may be connected together via network. The user device may be associated with a user, and the user may move to multiple locations with the user device, such as a first location and a second location. The geo-location server may determine geo-location pattern(s) associated with the user and the user device. The location system may determine location(s) associated with the user device based on GPS coordinates of the user device, cell tower triangulation of the user device, IP address lookup of the user device, etc. The risk engine may determine whether the user is authenticated (e.g., for utilizing a resource) based on a location of the user and the geo-location pattern(s) associated with the user.

In example implementation 100, assume that the user utilizes the user device at several locations (e.g., at home, at an office, etc.) and at different times, and that location information associated with the user device is generated at each location. Further, assume that the location information includes errors generated by the methods (e.g., GPS, cell tower triangulation, IP lookup, etc.) utilized to obtain the location information. As shown in FIG. 1, the user device may provide the location information, with errors, to the geo-location server and/or to the location system. The location system may provide the location information, with the errors, to the geo-location server.

The geo-location server may receive the location information, with the errors, from the user device and/or the location system, and may determine a geo-location pattern for the user based on the location information. A geo-location pattern may define an area, such as a house, an office building, a car, etc. associated with locations of the user. The area may include a set of coordinates associated with locations of the user. In some implementations, the area may include a circle with a radius (r) and center coordinates $(\bar{x},\bar{y})$, as shown in FIG. 1. A block dot in the geo-location pattern may represent a location coordinate (x,y) associated with the user at a particular time.

In some implementations, the geo-location server may calculate the radius (r) of the geo-location pattern based on the location information, and may calculate the center coordinates $(\bar{x},\bar{y})$ of the geo-location pattern based on the location information. The geo-location server may determine the geo-location pattern for the user based on the calculated radius and the calculated center coordinates. The geo-location server may output (e.g., display) and/or store the geo-location pattern for the user.

As further shown in FIG. 1, the geo-location server may provide, to the risk engine, the geo-location pattern for the user, which may represent the location information with minimal or no errors. The risk engine may utilize the geo-location pattern to authenticate the user. For example, assume that the user wishes to access a resource (e.g., an application, a computing resource, etc.) that requires the user to be authenticated. The geo-location server may determine the user's current location and may determine whether the user's current location is within the geo-location pattern. If the geo-location server determines that the user's current location is within the geo-location pattern, the geo-location server may provide this information to the risk engine. Based on the information, the risk engine may authenticate the user, and may grant the user access to the resource. If the geo-location server determines that the user's current location is not within the geo-location pattern, the geo-location server may provide this information to the risk engine. Based on this information, the risk engine may not authenticate the user, and may deny the user access to the resource.

Such a geo-location server may provide geo-location patterns that eliminate or minimize errors associated with user location information. When the errors associated with the user location information are eliminated or minimized, the user location information may be used to authenticate the user for utilization of a variety of resources. In some implementations, the error-free user location information may be utilized to provide more effective location-based advertising to the user. In some implementations, the error-free location information may be used to prevent fraudulent use of the user's user device, to prevent fraudulent access to resources (e.g., applications, computing resources, etc.), etc. For example, a user may be permitted access to a resource when the user provides correct login information and the user is located at a particular geo-location (e.g., work).

Figure 2:
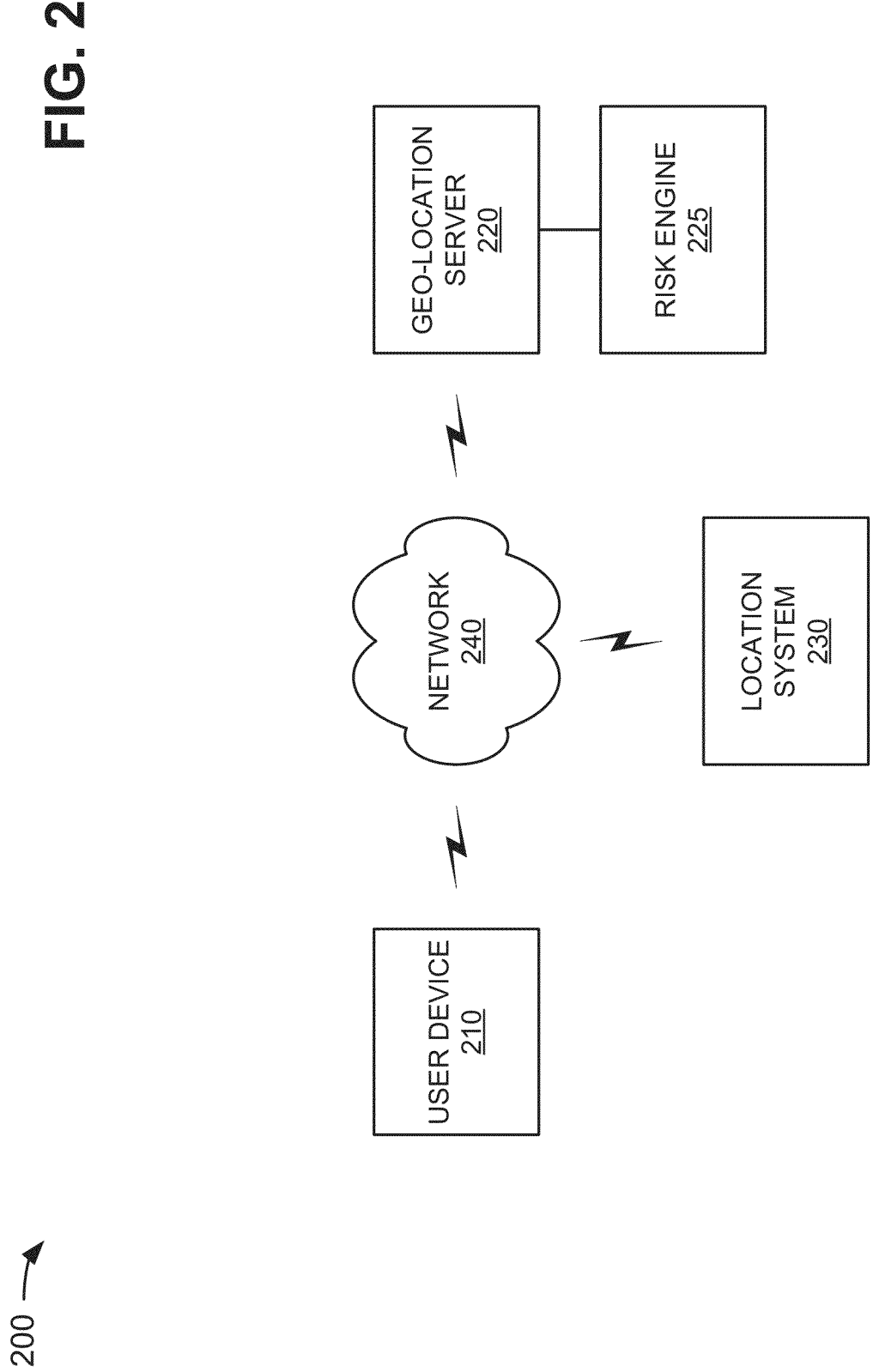
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a geo-location server 220, a risk engine 225, a location system 230, and a network 240. Devices/networks of environment 200 may interconnect via wired and/or wireless connections.

User device 210 may include a device that is capable of communicating over network 240 with geo-location server 220, risk engine 225, and/or location system 230. In some implementations, user device 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or other types of computation and communication devices.

Geo-location server 220 may include one or more personal computers, workstation computers, server devices, or other types of computation and communication devices. In some implementations, geo-location server 220 may determine, for a user, one or more geo-location patterns that eliminate or minimize errors associated with user location information. In some implementations, geo-location server 220 may receive a user's current location from user device 210 or location system 230. Geo-location server 220 may calculate a probability of the user being in the geo-location pattern(s) based on the user's current location. Geo-location server 220 may calculate a distance of the user from a center of a geo-location pattern based on the current location, and may calculate a velocity (e.g., if the user is moving) of the user based on the distance and the current location. In some implementations, geo-location server 220 may provide the calculated probability, distance, and/or velocity to risk engine 225 so that risk engine 225 may authenticate the user.

Risk engine 225 may include one or more personal computers, workstation computers, server devices, or other types of computation and communication devices. In some implementations, risk engine 225 may utilize a variety of factors to authenticate a user, such as a user name and password of the user, a location of user device 210; an IP address associated with user device 210; a name of the user; the calculated probability, distance, and/or velocity provided by geo-location server 220; etc. In some implementations, when risk engine 225 authenticates the user, risk engine 225 may grant the user access to, for example, a resource, such as an application. When risk engine 225 does not authenticate the user, risk engine 225 may deny the user access to, for example, a resource. In some implementations, risk engine 225 may be included in geo-location server 220 or may be separate from geo-location server 220.

Location system 230 may include one or more personal computers, workstation computers, server devices, or other types of computation and communication devices. In some implementations, location system 230 may determine a location of user device 210 by looking up an IP address of user device 210, obtaining GPS coordinates of user device 210, performing cell tower triangulation of user device 210, etc. At a given point in time, location system 230 may provide a user's current location, but may also introduce errors into the user's current location.

Network 240 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
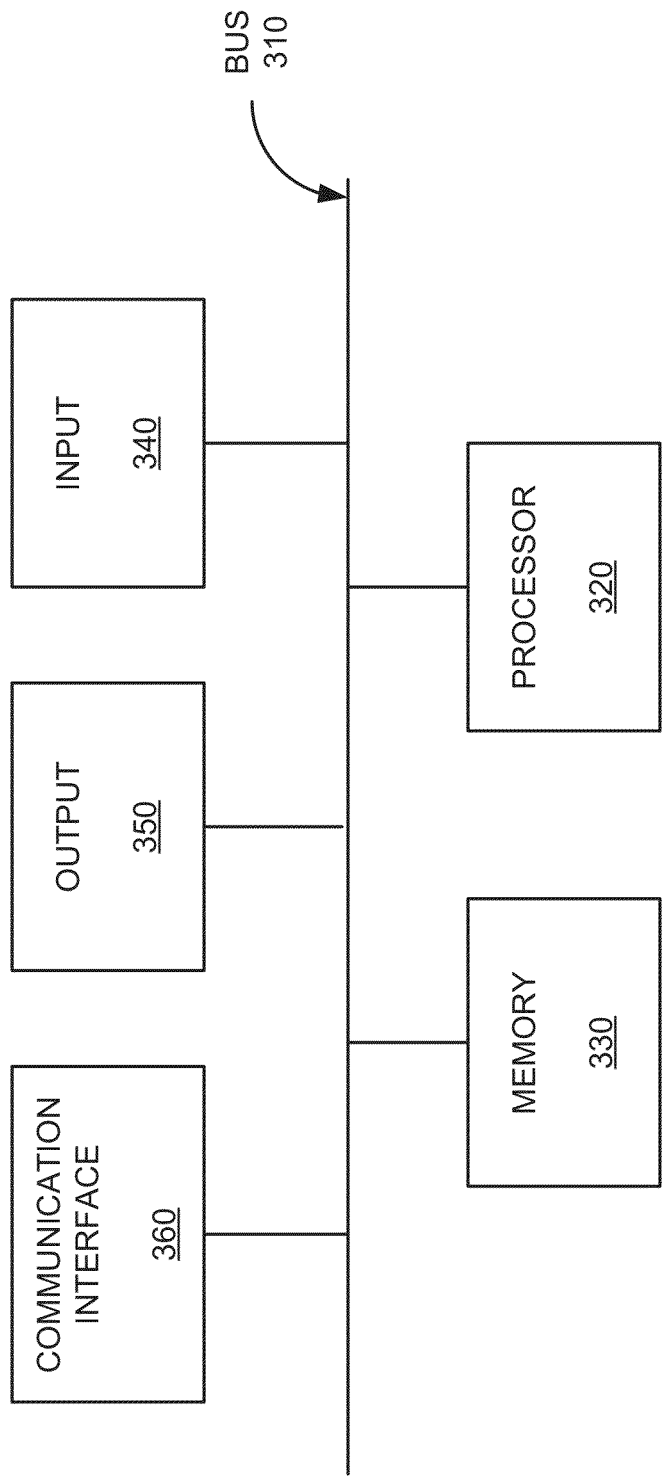
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
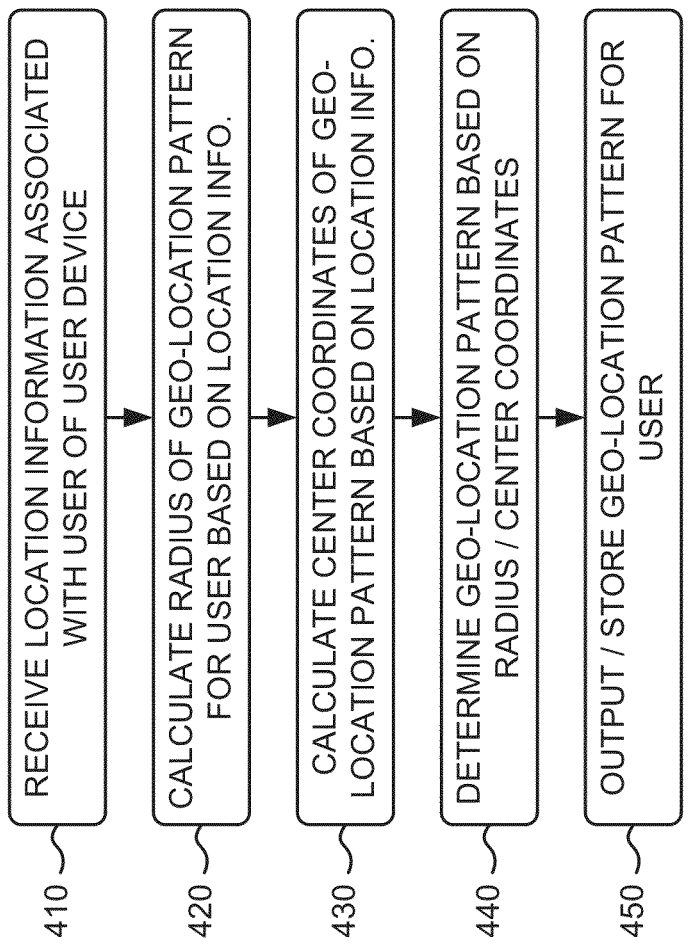
FIG. 4 is a flow chart of an example process for determining a geo-location pattern for a user.

FIG. 4 is a flow chart of an example process 400 for determining a geo-location pattern for a user. In some implementations, one or more process blocks of FIG. 4 may be performed by geo-location server 220. In some implementations, one or more process blocks of FIG. 4 may be performed by another device or a group of devices separate from or including geo-location server 220.

As shown in FIG. 4, process 400 may include receiving location information associated with a user of a user device (block 410). For example, a user may be associated with user device 210, and may utilize user device 210 at one or more locations (e.g., at home, at an office, etc.) and at different times. In some implementations, location information associated with user device 210 may be generated at each location. The location information may include, for example, location coordinates (e.g., a latitude coordinate and a longitude coordinate) associated with user device 210. For example, user device 210 may include a GPS component that generates the location coordinates associated with user device 210. In some implementations, the location information may include errors generated by methods (e.g., GPS, cell tower triangulation, IP lookup, etc.) utilized to obtain the location information.

In some implementations, user device 210 may automatically provide the location information, with errors, to geo-location server 220 and/or to location system 230. In some implementations, the user may instruct user device 210 to provide the location information, with errors, to geo-location server 220 and/or to location system 230. If location system 230 receives the location information, location system 230 may provide the location information, with the errors, to geo-location server 220. Geo-location server 220 may receive the location information, with the errors, from user device 210 and/or location system 230.

As further shown in FIG. 4, process 400 may include calculating a radius of a geo-location pattern for the user based on the location information (block 420). For example, geo-location server 220 may define a geo-location pattern for the user as a unit circle, and may calculate a radius (r) of the geo-location pattern based on the location information. In some implementations, the radius of the geo-location pattern may be defined as the radius of the unit circle, and may be large enough to fit the errors in the location information. The radius may be large enough so that the geo-location pattern covers locations to which the user may move. In some implementations, it may be assumed that latitude coordinates (x) and longitude coordinates (y) are approximately normally distributed. For example, assume that r=k·σ, where k may correspond to a constant and σ may correspond to a standard deviation of the latitude coordinate (x) within a geo-location pattern. Based on the empirical rule of normal distribution, about 68% of the latitude coordinates may be covered within a range of $\bar{x}\pm\sigma$; about 95% of the latitude coordinates may b covered within a range of $\bar{x}\pm2\sigma$; and about 99.7% of the latitude coordinates may be covered within a range of $\bar{x}\pm3\sigma$, where $\bar{x}$ may correspond to a mean of the latitude coordinate (x) within the geo-location pattern. The same may be true for the longitude coordinates (y) based on the empirical rule of normal distribution.

In some implementations, geo-location server 220 may set the constant (k) to a value greater than or equal to three (3), since almost all of the location coordinates (x,y) may be included in the geo-location pattern when the constant is set to such a value. In some implementations, geo-location server 220 may define the radius (r) of a geo-location pattern as follows:

$$r = k \cdot \sqrt{\sigma(x)^2 + \sigma(y)^2}, k \geq 3 \qquad \text{(Equation 1)},$$

where σ(x) and σ(y) may correspond to standard deviations of the latitude coordinates (x) and the longitude coordinates (y) within the geo-location pattern, and k may correspond to a constant that is greater than or equal to three (3).

In some implementations, geo-location server 220 may calculate the standard deviations of the latitude coordinates (x) (e.g., σ(x)) and the longitude coordinates (y) (e.g., σ(y)) based on standard deviation formulas, such as, for example:

$$\sigma = \sqrt{\frac{1}{n}\sum_{i=1}^{n}(x_i - \bar{x})^2} \text{ and}$$

$$\sigma = \sqrt{\frac{1}{n}\sum_{i=1}^{n}(y_i - \bar{y})^2},$$

where $(\bar{x},\bar{y})$ may correspond to the center coordinates of the geo-location pattern, $(x_i,y_i)$ may correspond to an ith coordinate of the geo-location pattern, and n may correspond to a number of coordinates in the geo-location pattern. In some implementations, geo-location server 220 may perform an incremental computation of the standard deviation for the latitude coordinates (x) as follows:

$$\sigma(x)_t^2 = \frac{\sum_{i=1}^{n}(x_i - \bar{x}_t)}{n}$$

-continued $$= \frac{\sum_{i=1}^{n-1}(x_i-\bar{x}_t)^2 + (x_n-\bar{x}_t)^2}{n}$$

$$= \frac{\sum_{i=1}^{n-1}(x_i-\bar{x}_t)^2}{n} + \frac{(x_n-\bar{x}_t)^2}{n}$$

$$= \frac{(n-1)\sum_{i=1}^{n-1}(x_i-\bar{x}_t)^2}{(n-1)n} + \frac{(x_n-\bar{x}_t)^2}{n}$$

$$\approx \frac{(n-1)}{n}\sigma(x)_{t-1}^2 + \frac{(x_n-\bar{x}_t)^2}{n}.$$

Geo-location server 220 may assume that:

$$\sigma(x)_{t-1}^2 = \frac{\sum_{i=1}^{n}(x_i-\bar{x}_{t-1})^2}{n-1} \approx \frac{\sum_{i=1}^{n}(x_i-\bar{x}_t)^2}{n-1}$$

and that $\bar{x}_{t-1} \approx \bar{x}_t$ since $\bar{x}_{t-1}$ almost equals $\bar{x}_t$ if there are enough location coordinates in the geo-location pattern. Based on these assumptions, geo-location server 220 may calculate the incremental standard deviations of the latitude coordinates (x) (e.g., σ(x)) and the longitude coordinates (y) (e.g., σ(y)) as follows:

$$(\sigma(x)_t, \sigma(y)_t) = \left(\sqrt{\frac{(n-1)\sigma(x)_{t-1}^2 + (x_c-\bar{x}_i)^2}{n}}, \sqrt{\frac{(n-1)\sigma(y)_{t-1}^2 + (y_c-\bar{y}_i)^2}{n}}\right) \quad \text{(Equation 2)}$$

where $(x_c, y_c)$ may correspond to current location coordinates, and $(\bar{x}_t, \bar{y}_t)$ may correspond to updated center coordinates of a geo-location pattern associated with $(x_c, y_c)$.

In some implementations, an initial value of the standard deviation may be provided if initial location coordinates are received by geo-location server 220 or if subsequent location coordinates are not within the geo-location pattern(s) of the user. The initial value of the standard deviation may be greater than or equal to the errors in the location information. For example, if the initial value of the standard deviation is represented as $\bar{\sigma}$, then geo-location server 220 may set $\bar{\sigma}(x)=\bar{\sigma}(y)=\bar{\sigma}$. If subsequent location coordinates (x,y) are provided in the geo-location pattern, geo-location server 220 may update the incremental standard deviations of the latitude coordinates (x) (e.g., σ(x)) and the longitude coordinates (y) (e.g., σ(y)) as described above and may update the center coordinates $(\bar{x},\bar{y})$ of the geo-location pattern as described below. Geo-location server 220 may set $(\hat{\sigma}(x),\hat{\sigma}(y))$ as a minimum standard deviation to maintain a lower boundary of the radius of the geo-location pattern. If the updated standard deviations (e.g., σ(x) and σ(y)) are less than the minimum standard deviation (e.g., $\sigma(x)<\hat{\sigma}(x)$ or $\sigma(y)<\hat{\sigma}(y)$), geo-location server 220 may not update the standard deviations (e.g., σ(x) and σ(y)).

As further shown in FIG. 4, process 400 may include calculating center coordinates of the geo-location pattern based on the location information (block 430). For example, geo-location server 220 may calculate the center coordinates $(\bar{x},\bar{y})$ of the geo-location pattern based on the location information. In some implementations, geo-location server 220 may define the center coordinates $(\bar{x},\bar{y})$ of the geo-location pattern as follows:

$$(\bar{x}, \bar{y}) = \left(\frac{\sum_{i}^{n} x_1}{n}, \frac{\sum_{i}^{n} y_1}{n}\right),$$

where $(x_i, y_i)$ may correspond to an ith coordinate of the geo-location pattern, and n may correspond to a number of coordinates in the geo-location pattern. In some implementations, geo-location server 220 may utilize every location coordinate in the geo-location pattern in order to calculate the center coordinates.

In some implementations, geo-location server 220 may not utilize every location coordinate in the geo-location pattern in order to calculate the center coordinates when retrieving every location coordinate is too expensive or when every location coordinate is not stored due to a large volume of location coordinates. In such implementations, geo-location server 220 may incrementally calculate the center coordinates $(\bar{x},\bar{y})$ of the geo-location pattern as follows:

$$(\bar{x}_t, \bar{y}_t) = \left(\frac{n\bar{x}_{t-1}}{n+1} + \frac{x_c}{n+1}, \frac{n\bar{y}_{t-1}}{n+1} + \frac{y_c}{n+1}\right), \quad \text{(Equation 3)}$$

where $(x_c, y_c)$ may correspond to a new location coordinate within the geo-location pattern; n may correspond to a number of coordinates in the geo-location pattern, which may be defined as n=n+1 if a new location coordinate has been added to the geo-location pattern; $(\bar{x}_t, \bar{y}_t)$ may correspond to current center coordinates; and $(\bar{x}_{t-1}, \bar{y}_{t-1})$ may correspond to the center coordinates before the geo-location pattern is updated.

In some implementations, the center coordinates $(\bar{x},\bar{y})$ of the geo-location pattern may be defined as a mean of x and y if coordinates (x,y) are within the geo-location pattern. The central limit theorem states that given certain conditions, a mean of a sufficiently large number of iterations of independent random variables will be approximately normally distributed. Based on the central limit theorem, it may be assumed that two directions x and y may be approximately normally distributed within a geo-location pattern. If x an y are independently approximately normally distributed, coordinates (x,y) may be two-variate normally distributed based on a multivariate normal distribution definition.

As further shown in FIG. 4, process 400 may include determining the geo-location pattern based on the radius and the center coordinates (block 440). For example, geo-location server 220 may determine the geo-location pattern for the user based on the calculated radius of the geo-location pattern and the calculated center coordinates of the geo-location pattern. In some implementations, geo-location server 220 may determine the geo-location pattern for the user based on the radius calculated in Equation 1 (e.g., and the standard deviations calculated in Equation 2) and the center coordinates calculated in Equation 3. In such implementations, the geo-location pattern may include an area covered by a unit circle with center coordinates $(\bar{x},\bar{y})$ and a radius (r) of $r=k \cdot \sqrt{\sigma(x)^2+\sigma(y)^2}$, $k \geq 3$.

In some implementations, geo-location server 220 may re-calculate the radius, re-calculate the center coordinates, and re-determine the geo-location pattern when new location information, associated with the user, is received.

As further shown in FIG. 4, process 400 may include outputting and/or storing the geo-location pattern for the user (block 450). For example, geo-location server 220 may output and/or store the determined geo-location pattern for the user. In some implementations, geo-location server 220 may provide the user's geo-location pattern(s) for display to a user associated with geo-location server 220. In some implementations, geo-location server 220 may provide the user's geo-location pattern(s) to risk engine 225. In some implementations, geo-location server 220 may store the user's geo-location pattern(s) in a storage device (e.g., memory 330, FIG. 3) associated with geo-location server 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
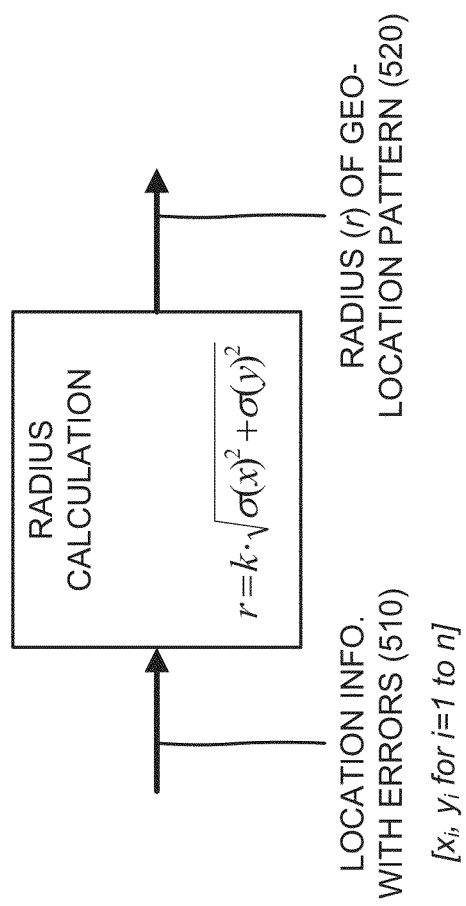

FIGS. 5A-5E are diagrams of an example 500 relating to example process 400 shown in FIG. 4. In example 500, assume that a user is associated with user device 210, as shown in FIG. 5A. Further, assume that that user utilizes user device 210 at a variety of physical locations, such as a first location and a second location. When the user utilizes user device 210 at the different locations, location information 510 associated with user device 210 and the user may be determined by user device 210 and/or location system 230. Location information 510 may include location coordinates of user device 210, such as GPS coordinates, a location of an IP address associated with user device 210, etc. Errors may be introduced into location information 510 by the techniques (e.g., GPS, cell tower triangulation, etc.) utilized to determine location information 510. As further shown in FIG. 5A, user device 210 may provide location information 510 (e.g., with the errors) to geo-location server 220 and/or location system 230. Location system 230 may provide location information 510 to geo-location server 220. Geo-location server 220 may receive location information 510 and may store location information 510.

As shown in FIG. 5B, location information 510 may include location coordinates, such as latitude coordinates ($x_i$) and longitude coordinates ($y_i$), where ($x_i, y_i$) may correspond to an ith location coordinate, and n may correspond to a number of location coordinates associated with the user. A radius calculation component of go-location server 220 may receive location information 510, as further shown in FIG. 5B. The radius calculation component may calculate a radius (r) 520 of a geo-location pattern associated with the user based on location information 510 and according to Equation 1 (e.g., $r = k \cdot \sqrt{\sigma(x)^2 + \sigma(y)^2}$, $k \geq 3$). The radius calculation component may output radius 520, as further shown in FIG. 5B.

Figure 5C:
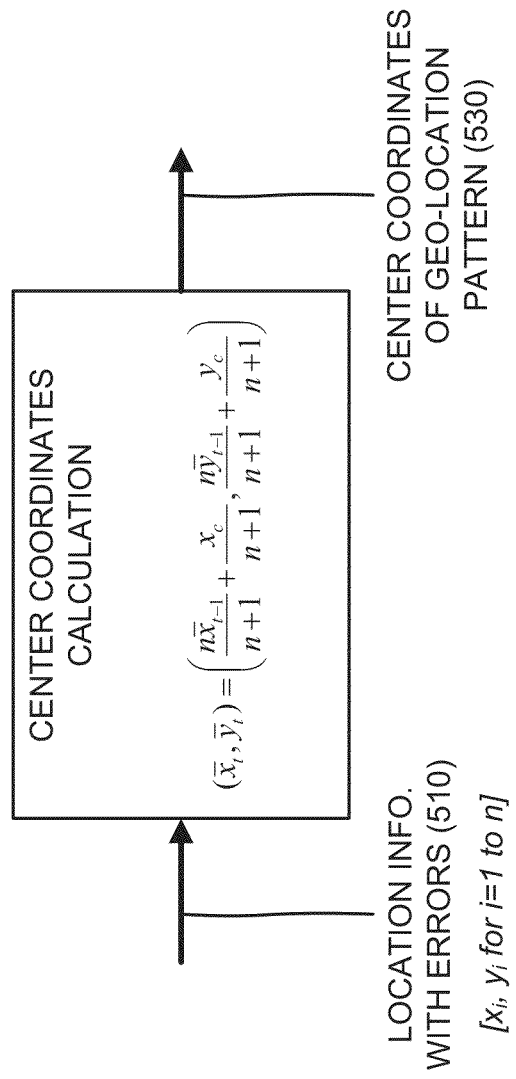

As shown in FIG. 5C, a center coordinates calculation component of geo-location server 220 may receive location information 510. The center coordinates calculation component may calculate center coordinates ($\bar{x}, \bar{y}$) 530 of the geo-location pattern based on location information 510 and according to Equation 3 (e.g., $$(\bar{x}_t, \bar{y}_t) = \left( \frac{n\bar{x}_{t-1}}{n+1} + \frac{x_c}{n+1}, \frac{n\bar{y}_{t-1}}{n+1} + \frac{y_c}{n+1} \right)).$$

The center coordinates component may output center coordinates 530, as further shown in FIG. 5C.

As shown in FIG. 5D, a pattern determination component of geo-location server 220 may receive radius 520 and center coordinates 530, and may determine one or more geo-location patterns 540 for the user based on radius 520 and center coordinates 530. In some implementations, geo-location pattern 540 may include an area covered by a unit circle with radius (r) 520 and center coordinates ($\bar{x}, \bar{y}$) 530. As further shown in FIG. 5D, the pattern determination component may store geo-location pattern(s) 540 in a storage device (e.g., memory 330, FIG. 3) associated with geo-location server 220.

In some implementations, the pattern determination component may provide geo-location pattern(s) 540 for display, as shown in FIG. 5E. For example, as shown in FIG. 5E, geo-location pattern(s) 540 may include a first geo-location pattern 550 and a second geo-location pattern 560. A black dot in geo-location pattern(s) 540 may represent a location coordinate (x,y) associated with the user. First geo-location pattern 550 may include a radius (r) and center coordinates, and second geo-location pattern 560 may include a different radius (r) and different center coordinates. As further shown in FIG. 5E, the user may be located within first geo-location pattern 550 (e.g., at home) most of the time, and the user may be located within second geo-location pattern 560 (e.g., at work) almost as much as within first geo-location pattern 550. The user may be located at particular coordinates (e.g., at a shopping mall, a sporting event, etc.) outside of first geo-location pattern 550 and second geo-location pattern 560, and these particular coordinates may not form a geo-location pattern.

As further shown in FIG. 5E, a two-dimensional normal distribution probability density function (PDF) may be used to measure a distance between the user's location (e.g., provided by a black dot) and the center coordinates of a geo-location pattern. In some implementations, the center coordinates may be located at a peak of a bell curve provided by the PDF.

As indicated above, FIGS. 5A-5E are provided merely as an example. Other examples are possible and may differ from what was described with regard to FIGS. 5A-5E.

FIG. 6 is a flow chart of an example process 600 for utilizing a geo-location pattern to authenticate a user. In some implementations, one or more process blocks of FIG. 6 may be performed by geo-location server 220 and/or risk engine 225. In some implementations, one or more process blocks of FIG. 6 may be performed by another device or a group of devices separate from or including geo-location server 220 and/or risk engine 225.

As shown in FIG. 6, process 600 may include receiving a request to access a resource, and current location information, from a user device associated with a user (block 610). For example, a user associated with user device 210 may wish to access a resource (e.g., a banking application, an online shopping application, etc.) that requires that the user be authenticated. The user may utilize user device 210 to generate a request to access the resource, and user device 210 may provide the request to geo-location server 220 and/or risk engine 225. Geo-location server 220 may receive the request from user device 210. In some implementations, user device 210 may generate current location information, and may provide the current location information to geo-location server 220 and/or location system 230. If user device 210 provides the current location information to location system 230, location system 230 may forward the current location information to geo-location server 220. Geo-location server 220 may receive the current location information from user device 210 and/or location system 230.

In some implementations, if user device 210 is physically moving with the user, the current location information may change as user device 210 moves to different locations. In some implementations, if user device 210 remains at a fixed location, the current location information may not change.

As further shown in FIG. 6, process 600 may include retrieving a geo-location pattern for the user based on the request to access the resource (block 620). For example, when geo-location server 220 receives the request to access the resource, geo-location server 220 may retrieve one or more geo-location patterns associated with the user. In some implementations, geo-location server 220 may retrieve the geo-location pattern(s) from a storage device (e.g., memory 330, FIG. 3) associated with geo-location server 220. In some implementations, the geo-location pattern(s) may be previously determined and stored by geo-location server 220, as described above in connection with FIG. 4.

As further shown in FIG. 6, process 600 may include determining whether the user is moving based on the current location information (block 630). For example, geo-location server 220 may determine whether the user is moving based on the current location information. In some implementations, geo-location server 220 may determine whether the current location information is changing over time. If the current location information is changing more than a particular amount (e.g., one meter, two meters, three meters, etc.) over a particular time (e.g., one second, two seconds, one minute, etc.), geo-location server 220 may determine that the user is moving with user device 210. For example, if the current location information indicates that the user is moving ten meters per second, geo-location server 220 may determine that the user is moving. In another example, if the current location information does not change or minimally changes over time (e.g., indicates that the user is moving ten meters per hour), geo-location server 220 may determine that the user is not moving.

As further shown in FIG. 6, if the user is not moving (block 630-USER NOT MOVING), process 600 may include calculating a probability of the user being in the geo-location pattern based on the current location information (block 640). For example, if geo-location server 220 determines that the user is not moving based on the current location information, geo-location server 220 may calculate a probability of the user being in the geo-location pattern based on the current location information. In some implementations, geo-location server 220 may determine the probability of the user being in the geo-location pattern according to the following equation:

$$p = \frac{n_j}{\sum_{i=1}^{N} n_i}, \qquad \text{(Equation 4)}$$

where $n_j$ may correspond to a number of times the user's location coordinates (e.g., provided by the current location information) are within the geo-location pattern; and $$\sum_{i=1}^{N} n_i$$

may correspond to the total number of the user's location coordinates provided in the current location information.

As further shown in FIG. 6, if the user is moving (block 630-USER MOVING), process 600 may include calculating a distance of the user based on the current location information (block 650). For example, if geo-location server 220 determines that the user is moving based on the current location information, geo-location server 220 may calculate a distance between the user's location and the center coordinates of the geo-location pattern based on the current location information. In some implementations, the current location information may include location coordinates (x,y) that are provided within the geo-location pattern. Geo-location server 220 may utilize a two-dimensional normal distribution probability density function (PDF) to measure a distance between the user's location (e.g., provided by the current location information) and the center coordinates of the geo-location pattern. In some implementations, the center coordinates may be located at a peak of a bell curve provided by the PDF. A range of the PDF may be between zero (0) and one (1), where a PDF value of one (1) may indicate that the location coordinates (x,y) are at the peak of the bell curve and a PDF value of less than one (1) may indicate a distance (dis) between the location coordinates (x,y) and the peak of the bell curve (e.g., the center coordinates).

In some implementations, geo-location server 220 may calculate the distance (dis) according to the following equation:

$$\text{dis} = \exp\left(-\left(\frac{(x-\bar{x})^2}{2\sigma(x)^2} + \frac{(y-\bar{y})^2}{2\sigma(y)^2}\right)\right), \qquad \text{(Equation 5)}$$

where $(\bar{x},\bar{y})$ may correspond to the center coordinates of the geo-location pattern, and $(\sigma(x), \sigma(y))$ may correspond to the standard deviations of the geo-location pattern. If the location coordinates (x,y) are located at the center coordinates $(\bar{x},\bar{y})$, the distance may be equal to one (1). If the location coordinates (x,y) are located away from the center coordinates $(\bar{x},\bar{y})$, the distance may move toward zero (0). In some implementations, the accuracy of the distance may depend on the user's location, weather, timing, user device 210, etc. since the calculation of the distance may depend on the errors associated with the location methods (e.g., GPS, IP lookup, etc.). In some implementations, geo-location server 220 may calculate the distance even when the user is not moving.

As further shown in FIG. 6, process 600 may include calculating a velocity of the user based on the distance and the current location information (block 660). For example, if geo-location server 220 determines that the user is moving based on the current location information, geo-location server 220 may calculate a velocity of the user based on the distance and the current location information. In some implementations, geo-location server 220 may calculate the velocity (spd) of the user according to the following equation:

$$\text{spd} = \frac{\text{dis}((x_1, y_1), (x_2, y_2))}{\delta t}, \qquad \text{(Equation 6)}$$

where $(x_1,y_1)$ and $(x_2,y_2)$ may correspond to two location coordinates associated with the user at different times; dis$((x_1,y_1), (x_2,y_2))$ may correspond to the distance between the two location coordinates; and $\delta t$ may correspond to a time difference.

In some implementations, the location coordinates of the current location information may be affected by errors associated with the location methods (e.g., GPS, IP lookup, etc.). For example, if two location coordinates should be equivalent but are different due to location method errors, geo-location server 220 may calculate a particular velocity for the user even though the user is not moving. Accordingly, geo-location server 220 may calculate the velocity (spd) of the user according to the following equation:

$$\text{spd} = \frac{\text{dis}((\bar{x}_1, \bar{y}_1), (\bar{x}_2, \bar{y}_2))}{\delta t}, \quad \text{(Equation 7)}$$

where $(\bar{x}_1, \bar{y}_1)$ and $(\bar{x}_2, \bar{y}_1)$ may correspond to center coordinates of geo-location patterns associated with the user at different times; $\text{dis}((\bar{x}_1, \bar{y}_1), (\bar{x}_2, \bar{y}_1))$ may correspond to the distance between the two center coordinates; and $\delta t$ may correspond to the time difference. By defining the user's velocity based on the center coordinates, the velocity calculation may be less affected by the location method errors.

As further shown in FIG. 6, process 600 may include determining whether the user is authenticated based on the probability, the distance, and/or the velocity (block 670). For example, geo-location server 220 may provide the calculated probability, distance, and/or velocity to risk engine 225, and risk engine 225 may receive the calculated probability, distance, and/or velocity. In some implementations, risk engine 225 may determine whether the user is authenticated based on the calculated probability, distance, and/or velocity. For example, risk engine 225 may determine that the user is authenticated when the probability of the user being in the geo-location pattern is greater than a particular probability threshold (e.g., 60%, 70%, 80%, etc.). For example, if the probability of the user being in the geo-location pattern is 95%, risk engine 225 may determine that the user is authenticated because the user is likely located in a location (e.g., the geo-location pattern) associated with the user. Risk engine 225 may determine that the user is not authenticated when the probability of the user being in the geo-location pattern is less than or equal to the particular probability threshold. For example, if the probability of the user being in the geo-location pattern is 15%, risk engine 225 may determine that the user is not authenticated because the user is likely not located in a location (e.g., the geo-location pattern) associated with the user.

In some implementations, risk engine 225 may determine that the user is authenticated when the distance of the user from the center of the geo-location pattern is less than a particular distance threshold (e.g., 10 meters, 20 meters, 30 meters, etc.). For example, if the distance of the user from the center of the geo-location pattern is 5 meters, risk engine 225 may determine that the user is authenticated because the user is located near a center of a location (e.g., the geo-location pattern) associated with the user. Risk engine 225 may determine that the user is not authenticated when the distance of the user from the center of the geo-location pattern is greater than or equal to the particular distance threshold. For example, if the distance of the user from the center of the geo-location pattern is 100 meters, risk engine 225 may determine that the user is not authenticated because the user is not located near a center of a location (e.g., the geo-location pattern) associated with the user.

In some implementations, risk engine 225 may determine that the user is authenticated when the velocity of the user is less than or equal to a particular velocity threshold (e.g., 150, 200, 300, etc. kilometers per hour). For example, if the velocity of the user is 5 kilometers per hour, risk engine 225 may determine that the user is authenticated because the user is moving at a logical velocity. Risk engine 225 may determine that the user is not authenticated when the velocity of the user is greater than the particular velocity threshold. For example, if the velocity of the user is 350 kilometers per hour, risk engine 225 may determine that the user is not authenticated because the user is moving at an illogical velocity.

In some implementations, risk engine 225 may assign different weights to the calculated probability, distance, and/or velocity when determining whether the user is authenticated. For example, since the distance calculation may be affected by the location method errors, risk engine 225 may assign the distance a smaller weight than the probability and/or the velocity when determining whether the user is authenticated. In such example, assume that risk engine 225 assigns weights of 0.4 to the probability and the velocity, and assigns a weight of 0.2 to the distance. Further, assume that the probability (e.g., 15%) and the velocity (e.g., 350 kilometers per hour) indicate that the user is not authenticated, and that the distance (e.g., 10 meters) indicates that the user is authenticated. Under such assumptions, risk engine 225 may determine that the user is not authenticated.

In another example, assume that the probability of the user being in the geo-location is 95%, that the distance of the user from the center of the geo-location pattern is 5 meters, and that the velocity of the user is minimal or zero. In such an example, risk engine 225 may determine that the user is authenticated because the user is probably in a location attributed to the user (e.g., the geo-location pattern), is near the center of the location, and is moving at a logical velocity.

As further shown in FIG. 6, if the user is authenticated (block 670-AUTHENTICATED), process 600 may include granting the user access to the resource (block 680). For example, if risk engine 225 determines that the user is authenticated based on the probability, the distance, and/or the velocity, risk engine 225 may grant the user access to the resource In some implementations, risk engine 225 may enable the user to access or download a requested resource when the user is authenticated. The user may utilize user device 210 to access or download the requested resource.

As further shown in FIG. 6, if the user is not authenticated (block 670-NOT AUTHENTICATED), process 600 may include denying the user access to the resource (block 690). For example, if risk engine 225 determines that the user is not authenticated based on the probability, the distance, and/or the velocity, risk engine 225 may deny the user access to the application. In some implementations, risk engine 225 may generate a denial message indicating that the user is denied access to the application. Risk engine 225 may provide the denial message to user device 210, and user device 210 may display the denial message to the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
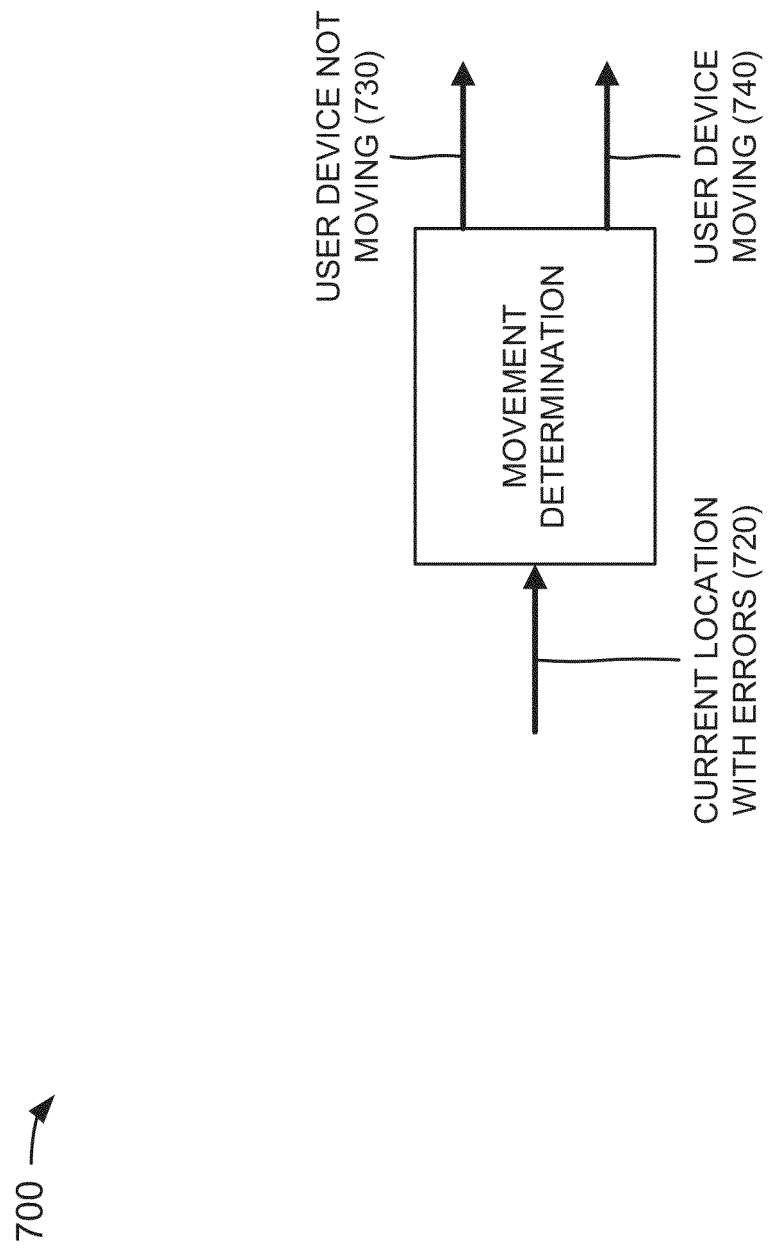

FIGS. 7A-7E are diagrams of an example 700 relating to example process 600 shown in FIG. 6. In example 700, assume a user associated with user device 210 wishes to access a banking application provided by an institution (e.g., a bank) that utilizes the services provided by geo-location server 220 and risk engine 225. The user may utilize user device 210 to generate a request 710 to access the banking application, and to provide request 710 to geo-location server 220, as shown in FIG. 7A. When user device 210 provides request 710 to geo-location server 220, user device 210 may provide current location information 720 to geo-location server 220, as further shown in FIG. 7A. Current location information 720 may include location coordinates of user device 210 over time, and may be provided by various location methods (e.g., GPS, IP address lookup, etc.). The location methods may generate errors in current location information 720. As a result, the exact location of use device 210 cannot be accurately determined.

Geo-location server 220 may receive request 710 and current location information 720, and may retrieve geo-location pattern(s) 540 (FIG. 5D), associated with the user, from a storage device, as further shown in FIG. 7A. Current location information 720 may be provided to a movement determination component of geo-location server 220, as shown in FIG. 7B. The movement determination component may determine whether user device 210 is moving based on current location information 720. In example 700, if the location coordinates of current location information 720 do not change or minimally change over time, the movement determination component may determine that user device 210 is not moving, as indicated by reference number 730 in FIG. 7B. If the location coordinates of current location information 720 change over time, the movement determination component may determine that user device 210 is moving, as indicated by reference number 740 in FIG. 7B.

Figure 7C:
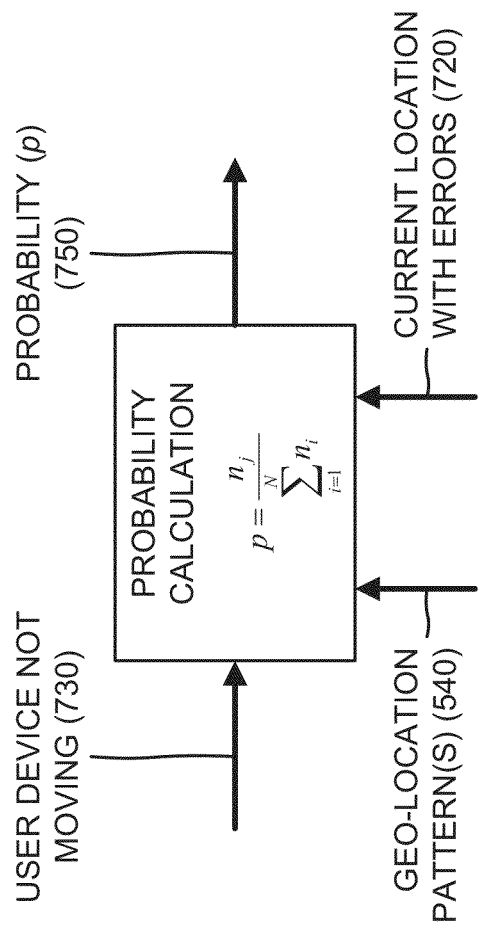

If user device 210 is not moving, the movement determination component may provide the user device not moving indication 730 to a probability calculation component of geo-location server 220, as shown in FIG. 7C. The probability calculation component may also receive geo-location pattern(s) 540 and current location information 720. The probability calculation component may calculate a probability (p) 750 that the user is located in a location covered by geo-location pattern(s) 540. In example 700, the probability calculation component may calculate probability 750 based on current location information 720 and according to Equation 4 (e.g., $$p = \frac{n_j}{\sum_{i=1}^{N} n_i}).$$

Figure 7D:
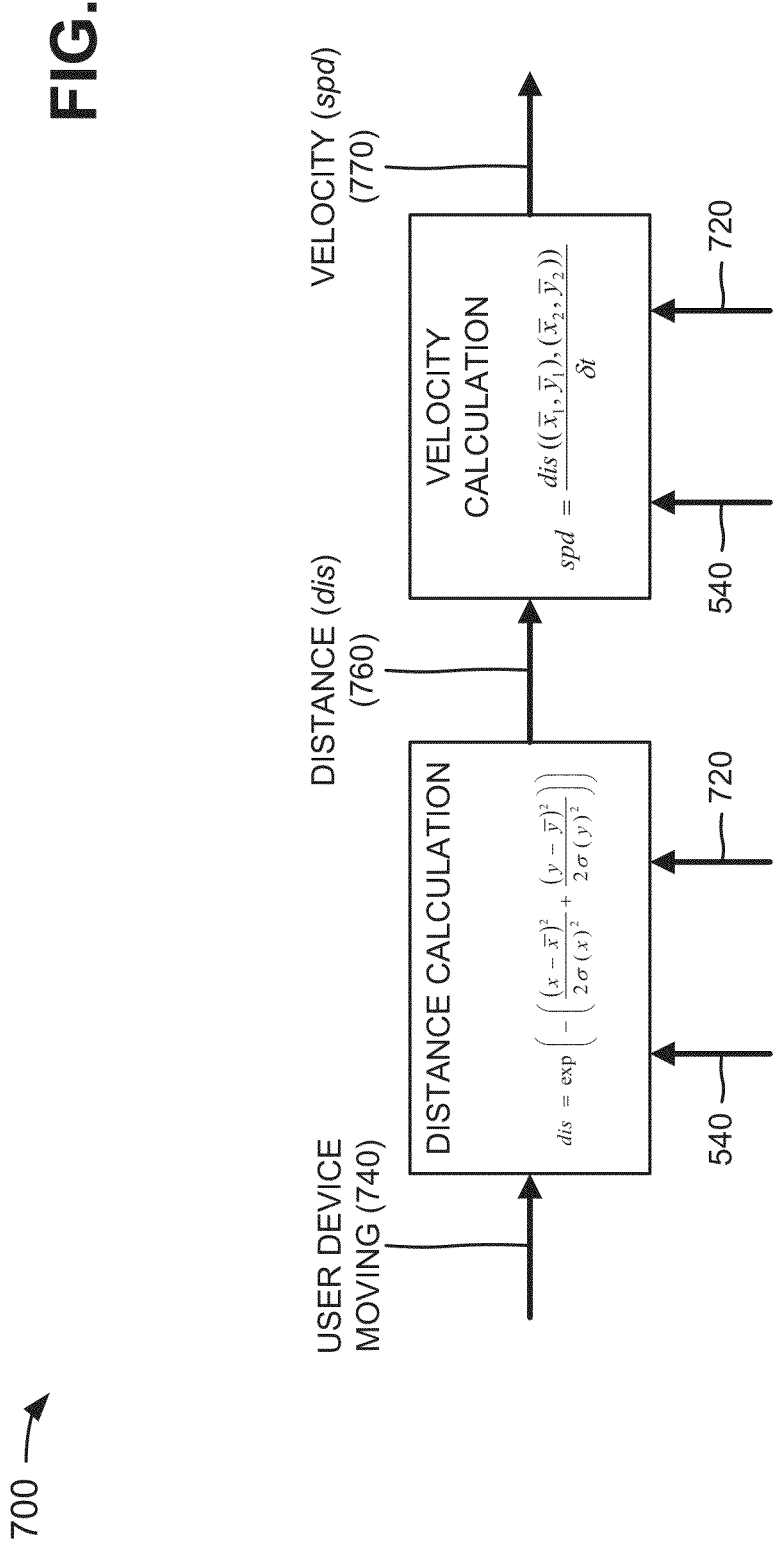

If user device 210 is moving, the movement determination component may provide the user device moving indication 740 to a distance calculation component of geo-location server 220, as shown in FIG. 7D. The distance calculation component may also receive geo-location pattern(s) 540 and current location information 720. The distance calculation component may calculate a distance (dis) 760 between the user's location and center coordinates of geo-location pattern(s) 540 based on current location information 720. In example 700, the distance calculation component may calculate distance 760 according to Equation 5 (e.g., $$dis = \exp\left(-\left(\frac{(x-\bar{x})^2}{2\sigma(x)^2} + \frac{(y-\bar{y})^2}{2\sigma(y)^2}\right)\right).$$

In some implementations, the distance calculation component may calculate distance 760 even when the user is not moving.

As further shown in FIG. 7D, the distance calculation component may provide distance 760 to a velocity calculation component of geo-location server 220. The velocity calculation component may also receive geo-location pattern(s) 540 and current location information 720. The velocity calculation component may calculate a velocity (spd) 770 of the user based on geo-location pattern(s) 540, current location information 720, and distance 760. In example 700, the velocity calculation component may calculate velocity 770 according to Equation 7 (e.g., $$spd = \frac{dis((\bar{x}_1, \bar{y}_1), (\bar{x}_2, \bar{y}_2))}{\delta t}).$$

Figure 7E:
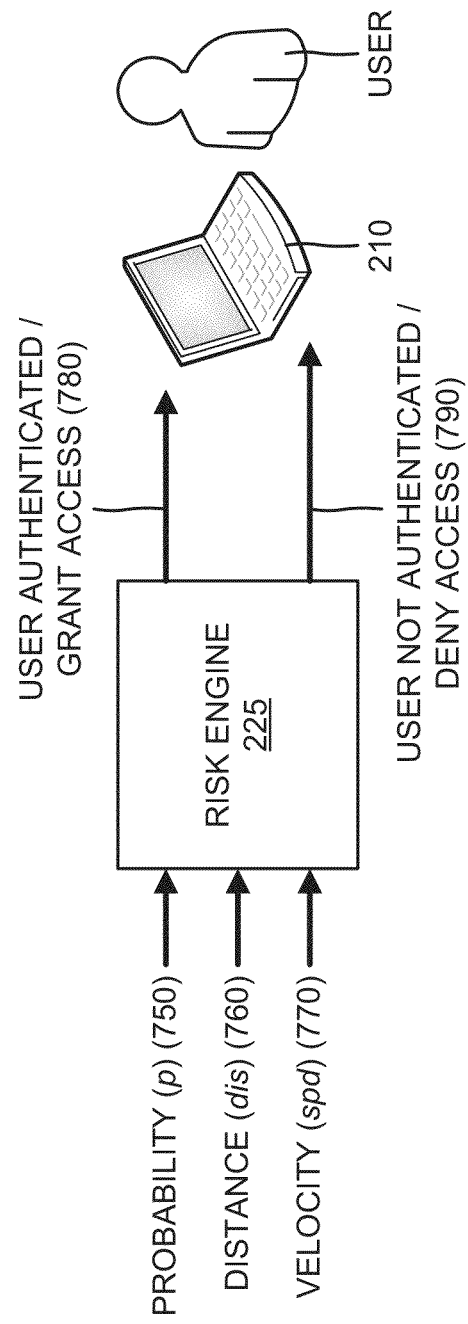

Probability 750, distance 760, and velocity 770 may be provided to risk engine 225, and risk engine may receive probability 750, distance 760, and velocity 770, as shown in FIG. 7E. Risk engine 225 may determine whether the user is authenticated based on probability 750, distance 760, and/or velocity 770. In example 700, if risk engine 225 determines that the user is authenticated based on probability 750, distance 760, and/or velocity 770, risk engine 225 may grant the user access to the banking application, as indicated by reference number 780 in FIG. 7E. The user may utilize user device 210 to access or download the banking application. If risk engine 225 determines that the user is not authenticated based on probability 750, distance 760, and/or velocity 770, risk engine 225 may deny the user access to the banking application, as indicated by reference number 790 in FIG. 7E. Risk engine 225 may provide a denial message to user device 210, and user device 210 may display the denial message to the user.

As indicated above, FIGS. 7A-7E are provided merely as an example. Other examples are possible and may differ from what was described with regard to FIGS. 7A-7E.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
receiving, by a device, location information associated with a user of a user device,
the location information including location coordinates associated with the user device over time, and
the location information including errors introduced by one or more location methods used to determine the location information;
calculating, by the device, a radius of a geo-location pattern based on the location information,
the geo-location pattern identifying a geographical area encompassing one or more of the location coordinates of the user device;
calculating, by the device, center coordinates of the geo-location pattern based on the location information;
determining, by the device, the geo-location pattern based on the calculated radius and the calculated center coordinates;
storing, by the device, the geo-location pattern;
receiving, by the device, a request to access a resource from the user device;
receiving, by the device, current location information associated with the user device,
the current location information including current location coordinates associated with the user device when the request is received;
calculating, by the device, a probability of the user device being within the geo-location pattern based on the current location information;
calculating, by the device, a distance of the user device from the center coordinates of the geo-location pattern based on the current location information;
determining, by the device, whether the user device is moving based on the current location information;
calculating, by the device and when the user device is moving, a velocity of the user device based on the distance and the current location information; and
determining, by the device, whether the user is authenticated to access the resource based on the probability, the distance, and the velocity.

2. The method of claim 1, further comprising:
granting the user access to the resource when the user is determined to be authenticated; and
denying the user access to the resource when the user is determined to not be authenticated.

3. The method of claim 1, where different weights are assigned to the probability, the distance, and the velocity when determining whether the user is authenticated to access the resource.

4. The method of claim 1, where the geographical area of the geo-location pattern is defined by the center coordinates $(\bar{x}, \bar{y})$ and the radius (r), the radius being calculated according:

$$r = k \cdot \sqrt{\sigma(x)^2 + \sigma(y)^2}, k > 3,$$

where $\sigma(x)$ and $\sigma(y)$ correspond to standard deviations of latitude coordinates (x) and longitude coordinates (y) within the geo-location pattern, and k corresponds to a constant.

5. The method of claim 1, where the center coordinates $(\bar{x}, \bar{y})$ are calculated according to:

$$(\bar{x}_t, \bar{y}_t) = \left( \frac{n\bar{x}_{t-1}}{n+1} + \frac{x_c}{n+1}, \frac{n\bar{y}_{t-1}}{n+1} + \frac{y_c}{n+1} \right),$$

where $(x_c, y_c)$ corresponds to a new location coordinate within the geo-location pattern; n corresponds to a number of coordinates in the geo-location pattern; $(\bar{x}_t, \bar{y}_t)$ corresponds to current center coordinates; and $(\bar{x}_{t-1}, \bar{y}_{t-1})$ corresponds to center coordinates before the geo-location pattern is updated.

6. A device, comprising:
one or more processors to:
receive location information associated with a user of a user device,
the location information including location coordinates associated with the user device over time, and
the location information including errors introduced by one or more location methods used to determine the location information,
calculate a radius of a geo-location pattern based on the location information,
the geo-location pattern identifying a geographical area encompassing one or more of the location coordinates of the user device,
calculate center coordinates of the geo-location pattern based on the location information,
determine the geo-location pattern based on the calculated radius and the calculated center coordinates,
store the geo-location pattern in a memory associated with the device,
receive a request to access a resource from the user device,
receive current location information associated with the user device,
the current location information including current location coordinates associated with the user device when the request is received,
calculate a probability of the user device being within the geo-location pattern based on the current location information,
calculate a distance of the user device from the center coordinates of the geo-location pattern based on the current location information,
determine whether the user device is moving based on the current location information,
calculate, when the user device is moving, a velocity of the user device based on the distance and the current location information, and
determine whether the user is authenticated to access the resource based on the probability, the distance, and the velocity.

7. The device of claim 6, where the one or more processors are further to:
grant the user access to the resource when the user is determined to be authenticated, and
deny the user access to the resource when the user is determined to not be authenticated.

8. The device of claim 6, where different weights are assigned to the probability, the distance, and the velocity when determining whether the user is authenticated to access the resource.

9. The device of claim 6, where the geographical area of the geo-location pattern is defined by the center coordinates $(\bar{x}, \bar{y})$ and the radius (r), the radius being calculated according to:

$$r = k \cdot \sqrt{\sigma(x)^2 + \sigma(y)^2}, k \geq 3,$$

where σ(x) and σ(y) correspond to standard deviations of latitude coordinates (x) and longitude coordinates (y) within the geo-location pattern, and k corresponds to a constant.

10. The device of claim 6, where the center coordinates $(\bar{x}, \bar{y})$ are calculated according to:

$$(\bar{x}_t, \bar{y}_t) = \left( \frac{n\bar{x}_{t-1}}{n+1} + \frac{x_c}{n+1}, \frac{n\bar{y}_{t-1}}{n+1} + \frac{y_c}{n+1} \right),$$

where $(x_c, y_c)$ corresponds to a new location coordinate within the geo-location pattern; n corresponds to a number of coordinates in the geo-location pattern; $(\bar{x}_t, \bar{y}_t)$ corresponds to current center coordinates; and $(\bar{x}_{t-1}, \bar{y}_{t-1})$ corresponds to center coordinates before the geo-location pattern is updated.

11. A non-transitory computer-readable medium for storing instructions, the instructions comprising:
one or more instructions that, when executed by one or more processors of a device, cause the one or more processors to:
receive location information associated with a user of a user device,
the location information including location coordinates associated with the user device over time, and
the location information including errors introduced by one or more location methods used to determine the location information,
calculate a radius of a geo-location pattern based on the location information,
the geo-location pattern identifying a geographical area encompassing one or more of the location coordinates of the user device,
calculate center coordinates of the geo-location pattern based on the location information,
determine the geo-location pattern based on the calculated radius and the calculated center coordinates,
store the geo-location pattern,
receive a request to access a resource from the user device,
receive current location information associated with the user device,
the current location information including current location coordinates associated with the user device when the request is received,
calculate a probability of the user device being within the geo-location pattern based on the current location information,
calculate a distance of the user device from the center coordinates of the geo-location pattern based on the current location information,
determine whether the user device is moving based on the current location information,
calculate, when the user device is moving, a velocity of the user device based on the distance and the current location information, and
determine whether the user is authenticated to access the resource based on the probability, the distance, and the velocity.

12. The computer-readable medium of claim 11, where the instructions further comprise:
one or more instructions that, when executed by the one or more processors, cause the one or more processors to:
grant the user access to the resource when the user is determined to be authenticated, and
deny the user access to the resource when the user is determined to not be authenticated.

13. The computer-readable medium of claim 11, where the geographical area of the geo-location pattern is defined by the center coordinates $(\bar{x}, \bar{y})$ and the radius (r), the radius being calculated according to:

$$r = k \cdot \sqrt{\sigma(x)^2 + \sigma(y)^2}, k \geq 3,$$

where σ(x) and σ(y) correspond to standard deviations of latitude coordinates (x) and longitude coordinates (y) within the geo-location pattern, and k corresponds to a constant.

14. The computer-readable medium of claim 11, where the center coordinates $(\bar{x}, \bar{y})$ are calculated according to:

$$(\bar{x}_t, \bar{y}_t) = \left( \frac{n\bar{x}_{t-1}}{n+1} + \frac{x_c}{n+1}, \frac{n\bar{y}_{t-1}}{n+1} + \frac{y_c}{n+1} \right),$$

where $(x_c, y_c)$ corresponds to a new location coordinate within the geo-location pattern; n corresponds to a number of coordinates in the geo-location pattern; $(\bar{x}_t, \bar{y}_t)$ corresponds to current center coordinates; and $(\bar{x}_{t-1}, \bar{y}_{t-1})$ corresponds to center coordinates before the geo-location pattern is updated.

15. The method of claim 1, further comprising:
calculating the geographical area of the geo-location pattern based on the center coordinates and the radius.

16. The method of claim 1, where receiving the location information includes one or more of:
receiving the location information based an Internet protocol (IP) address associated with the user device,
receiving the location information based on global positioning system (GPS) coordinates associated with the user device, or
receiving the location information based on cell tower triangulation of the user device.

17. The device of claim 6, where the one or more processors are further to:
calculate the geographical area of the geo-location pattern based on the center coordinates and the radius.

18. The device of claim 6, where the one or more processors, when receiving the location information, are to one or more of:
receive the location information based an Internet protocol (IP) address associated with the user device,
receive the location information based on global positioning system (GPS) coordinates associated with the user device, or
receive the location information based on cell tower triangulation of the user device.

19. The computer-readable medium of claim 11, where the instructions further comprise:
one or more instructions that, when executed by the one or more processors, cause the one or more processors to:
calculate the geographical area of the geo-location pattern based on the center coordinates and the radius.

20. The computer-readable medium of claim 11, where the one or more instructions that cause the one or more processors to receive the location information include:
one or more instructions that, when executed by the one or more processors, cause the one or more processors to one or more of:

receive the location information based an Internet protocol (IP) address associated with the user device,
receive the location information based on global positioning system (GPS) coordinates associated with the user device, or
receive the location information based on cell tower triangulation of the user device.

\* \* \* \* \*